United States Patent
Gaither et al.

(10) Patent No.: US 7,051,195 B2
(45) Date of Patent: May 23, 2006

(54) METHOD OF OPTIMIZATION OF CPU AND CHIPSET PERFORMANCE BY SUPPORT OF OPTIONAL READS BY CPU AND CHIPSET

(75) Inventors: Blaine D. Gaither, Fort Collins, CO (US); Robert J Brooks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 574 days.

(21) Appl. No.: 10/002,971

(22) Filed: Oct. 26, 2001

(65) Prior Publication Data

US 2003/0084274 A1 May 1, 2003

(51) Int. Cl.
*G06F 13/18* (2006.01)
(52) U.S. Cl. .................... 712/235; 712/300
(58) Field of Classification Search ........... 712/235, 712/207, 237, 300; 711/158
See application file for complete search history.

(56) References Cited

U.S. PATENT DOCUMENTS

| | | | | |
|---|---|---|---|---|
| 5,694,574 A | * | 12/1997 | Abramson et al. | 711/140 |
| 5,892,936 A | * | 4/1999 | Tran et al. | 712/216 |
| 6,567,901 B1 | * | 5/2003 | Neufeld | 711/158 |
| 6,654,860 B1 | * | 11/2003 | Strongin et al. | 711/154 |

* cited by examiner

Primary Examiner—Henry W. H. Tsai

(57) ABSTRACT

In processing an instruction request, the invention determines whether the request is speculative or not based upon a bit field within the instruction. If the request is speculative, bus congestion and/or target memory is assessed for conditions and a decision is made, based on the conditions, as to whether or not to process the request. To facilitate the invention, certain bit fields within the instruction are encoded to identify the request as speculative or not. Additional bit fields may define a priority of a speculative request to influence the decision to process as based on the conditions. CPU architectures incorporating prefetch logic may be modified to recognize instructions encoded with speculation and priority identification fields to implement the invention in existing systems. Other logic, e.g., bus controllers and switches, may similarly process speculative requests to enhance system performance.

20 Claims, 2 Drawing Sheets

Figure 1:
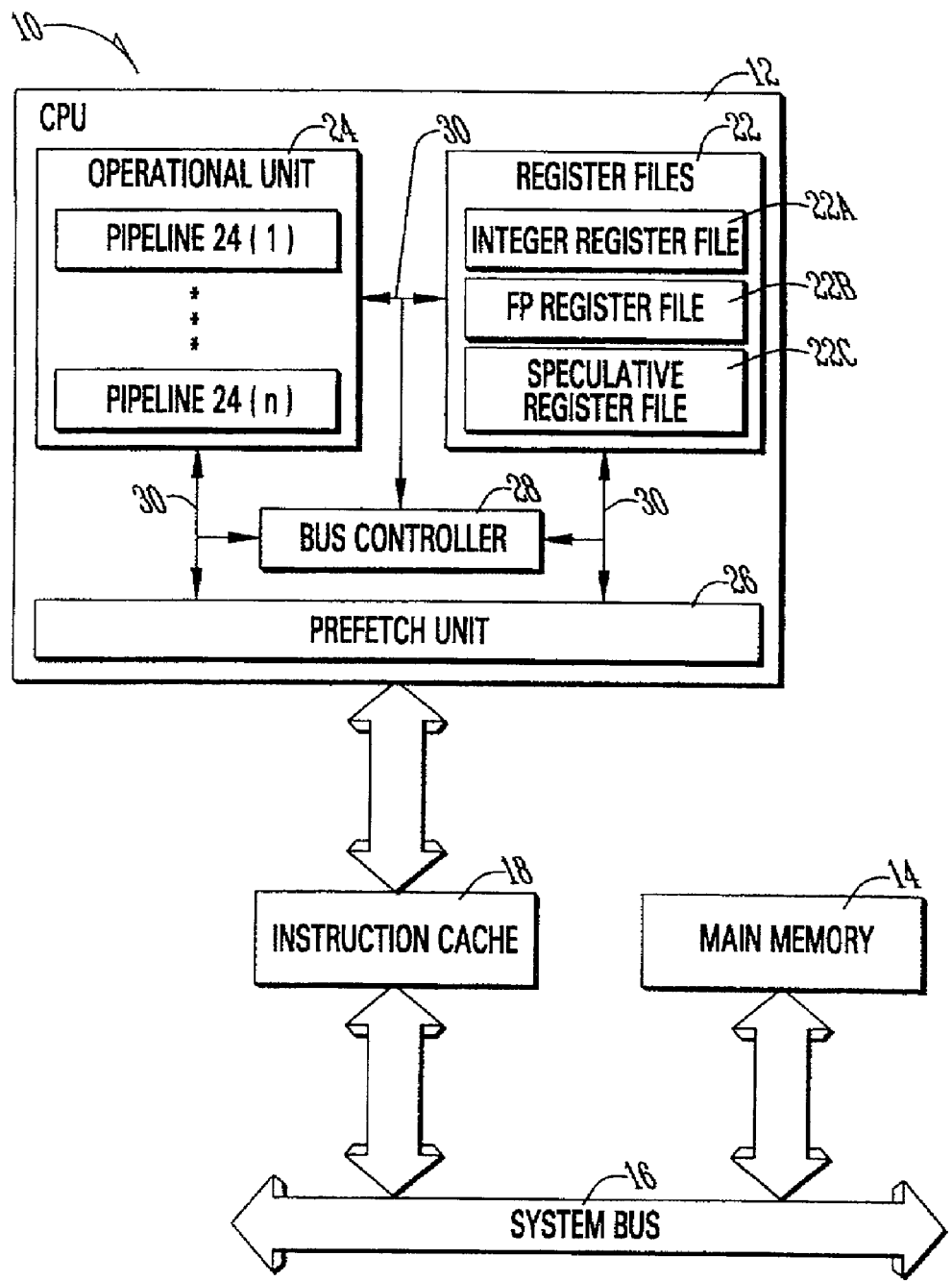

METHOD OF OPTIMIZATION OF CPU AND CHIPSET PERFORMANCE BY SUPPORT OF OPTIONAL READS BY CPU AND CHIPSET

BACKGROUND OF THE INVENTION

Computer systems are composed of one or more central processing units (CPUs), a bus or other interconnect fabric, memory controllers, and input/output (I/O) adapters. These resources are subject to contention; and management of that contention is necessary to optimize performance. Specifically, "latency," the delay between the initiation of an operation and its completion, and "bandwidth," the aggregate volume of operations, are frequently traded against one another. CPU designs have thus attempted to reduce apparent latency by performing "speculative" operations, that is, operations initiated early before all information is present as to the necessity or specific parameters of the operation. Prefetching and branch prediction are examples of this speculation. Such speculation may either be explicit, under control of program instructions, or implicit, via automatic operation of the CPU logic. These speculative operations increase demand on available bandwidth. If the excess demand is too great, unbalanced system operation due to resource contention ("hotspots") could result, perhaps to the point of reducing overall system performance to below the point that would have been obtained had speculation not occurred. Thus, there is the need for system-wide management of speculative transactions.

One problem with prefetching in the prior art is that much of the data read through speculation is not actually used. That is, a speculative read may issue even though the requester is not assured that the data will be executed or the subject of a load. Prior art CPUs and chip-sets nevertheless treat speculative memory traffic and non-speculative memory traffic the same, even though speculative data may cause congestion and memory latency for non-speculative requests. This problem is exacerbated with high bus utilization; for example, it has been shown that speculative traffic may account for 50% or more of bus traffic.

It is, accordingly, one object of the invention to provide methods and systems for processing speculative requests in a way to reduce congestion and collisions with non-speculative traffic. Other objects of the invention are apparent within the description that follows.

SUMMARY OF THE INVENTION

The following U.S. patents provide useful background to the invention and are accordingly incorporated herein by reference: U.S. Pat. No. 6,292,871; U.S. Pat. No. 5,778,219; U.S. Pat. No. 5,761,490; U.S. Pat. No. 5,721,865; U.S. Pat. No. 5,566,324; U.S. Pat. No. 4,980,823.

In one aspect, the invention provides a method of identifying speculative memory requests to reduce congestion or saturation in bus traffic or within a CPU or chipset. Such instructions are tagged with identifying bits (denoted herein as the "speculative ID") readable by logic utilizing the instructions in order to distinguish the request as speculative. By way of example, a CPU or chipset processing the request are programmed to identify the speculative ID. As needed, that CPU or chipset may dispose of or ignore the speculative request in preference of minimizing bus traffic and/or to preferentially process non-speculative reads.

The invention of another aspect identifies speculative requests in memory request transaction protocols. Transactions that are speculative are considered "optional" by the CPU, or chipset, and may be terminated without returning data. Speculative read requests are then preferentially ignored, or in some cases destroyed, should the CPU bus become saturated or congested. In one example of the invention, a transaction may be aborted if the request receives an error, rather than trying to recover or retry the request.

In another aspect, the invention provides a CPU or chipset architecture that processes transactions and identifies whether the transaction is speculative or not. The architecture preferably is of the type utilizing prefetch logic that decodes the transaction in order to distinguish memory system accesses that are speculative (e.g., prefetched) as compared to non-speculative "demand" memory accesses required for forward progress. When the architecture detects congestion or saturation, either in internal processing or within bus traffic, or within target memory, the speculative transaction is ignored or aborted to facilitate other more important transactions.

In yet another aspect, the invention provides a method for monitoring bus requests to identify speculative reads versus mandatory reads, in order to enhance transaction throughput. A bus controller, switch or other logic device coupled with the bus elects either to carry out speculative transactions, or not, depending upon traffic or saturation conditions on the bus or within target memory. In one example, therefore, a speculative load request to read data out of memory and to load data into registers within the register file may be ignored, as needed. In accord with the invention, a CPU on the bus is programmed to function properly when a speculative request is not processed. Aborting a transaction preferably also includes the step of returning a response in appropriate bus protocols; accordingly, such a response may be used to notify devices desiring reply from the speculative request so as to proceed to other processing.

As used herein, a "request" can for example be an instruction, a load (including explicit or implicit loads), a message, or an operational request. As used herein, an "interconnect" can for example be a bus, a crossbar, a switch, and a point-to-point protocol.

In accord with another aspect, the invention provides a method of asserting a priority designation to speculative requests. Logic devices decoding the requests determine the priority and order processing based on the priority. A CPU connected to the logic devices may alter the priority of certain requests to improve performance.

The invention provides certain advantages. Processing architectures may be enhanced to identify and manage speculative reads so as to improve performance when bus traffic or target memory is saturated. Logic components linked to the processing architecture—e.g., switches or bus controllers, may independently decide to act, or not, on speculative transactions. A CPU or chipset device that already includes prefetch or branch capabilities may be modified or programmed, in accord with the invention, to detect and manage speculative bus requests. Such a device may for example decide that its instruction queue is too long and simply ignore the speculative request.

In another aspect of the invention, a method is provided for processing a request, such as an instruction, message or operational request, through a processor. The method includes the step of determining whether the request is speculative or not based upon a first identifier. The first identifier may for example reside as one or more bit fields within an instruction or transaction. The method further includes the steps of assessing one or both of interconnect and target resource conditions in the event that the request is speculative, and either processing the request, or not, as a function of the conditions. Assessing interconnect resource conditions may for example include assessing bus congestion and/or utilization, crossbar congestion and/or utilization, and/or point-to-point link utilization. Assessing target resource conditions may for example include assessing memory utilization and/or buffer space utilization.

In another aspect, the method may further include the step of decoding the first identifier as a speculative ID within the request. Another step of the method can include the step of encoding a bit field within the request to define the request as speculative or not.

In yet another aspect, the method may include the step of determining a priority of the request based upon a second identifier, in the event that the request is speculative. As such, the step of processing the request includes processing the request, or not, based upon the conditions and the priority. The priority identifier may be determined, for example, by decoding the second identifier as a second bit field within the request. Another step of the method can include the step of encoding the second bit field within the request to associate the request with a priority.

A typical request of the invention is a memory read request or a memory load request. The step of determining whether one of these requests is speculative may be accomplished by a CPU, chipset, bus controller, memory controller, or other logic device, to determine whether the request is speculative. In a particular advantage of the invention, this CPU, chipset, bus controller and memory controller may function independently to control the step of processing the request based on the conditions. That is, these devices do not necessarily require separate instruction so as to ignore, process or abort a speculative request.

In preferred aspects of the invention, the step of assessing target resource conditions includes assessing one or more of memory utilization, memory congestion, buffer space utilization, and bus congestion.

In preferred aspects of the invention, the step of assessing interconnect conditions includes assessing one or more of bus utilization, bus congestion, crossbar utilization, cross bar congestion, and point-to-point link utilization.

The invention also provides an improvement to CPU architecture of the type that initiates both speculative and non-speculative memory requests. This improvement includes decode logic, to determine whether the requests are speculative, and assessment logic, to determine one or both of interconnect and target resource conditions. The improved CPU architecture then processes speculative requests, or not, as a function of the conditions.

In one aspect of the invention, the improved CPU architecture includes a prefetch unit that prefetches speculative requests; the decode logic then detects whether prefetched requests are speculative.

The invention further provides a system for processing speculative requests. One or more requests in the system have bit fields defining the requests as speculative or non-speculative. Decode logic within the system decodes the bit fields to determine whether one or more requests are speculative. And processing logic within the system processes speculative requests, or not, based on at least one of interconnect and target resource conditions. By way of example, one or both of the decode logic and processing logic may include a CPU, a chipset, a bus controller and/or a memory controller.

In a further aspect, the system includes a bus controller for assessing one or more of bus congestion and bus utilization conditions.

The invention is next described further in connection with preferred embodiments, and it will become apparent that various additions, subtractions, and modifications can be made by those skilled in the art without departing from the scope of the invention.

BRIEF DESCRIPTION OF THE EMBODIMENTS

Figure 2:
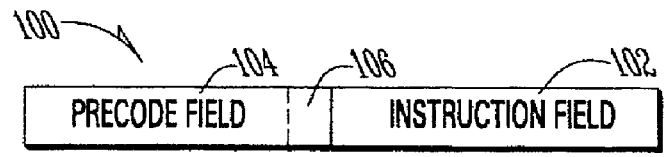
Figure 3:
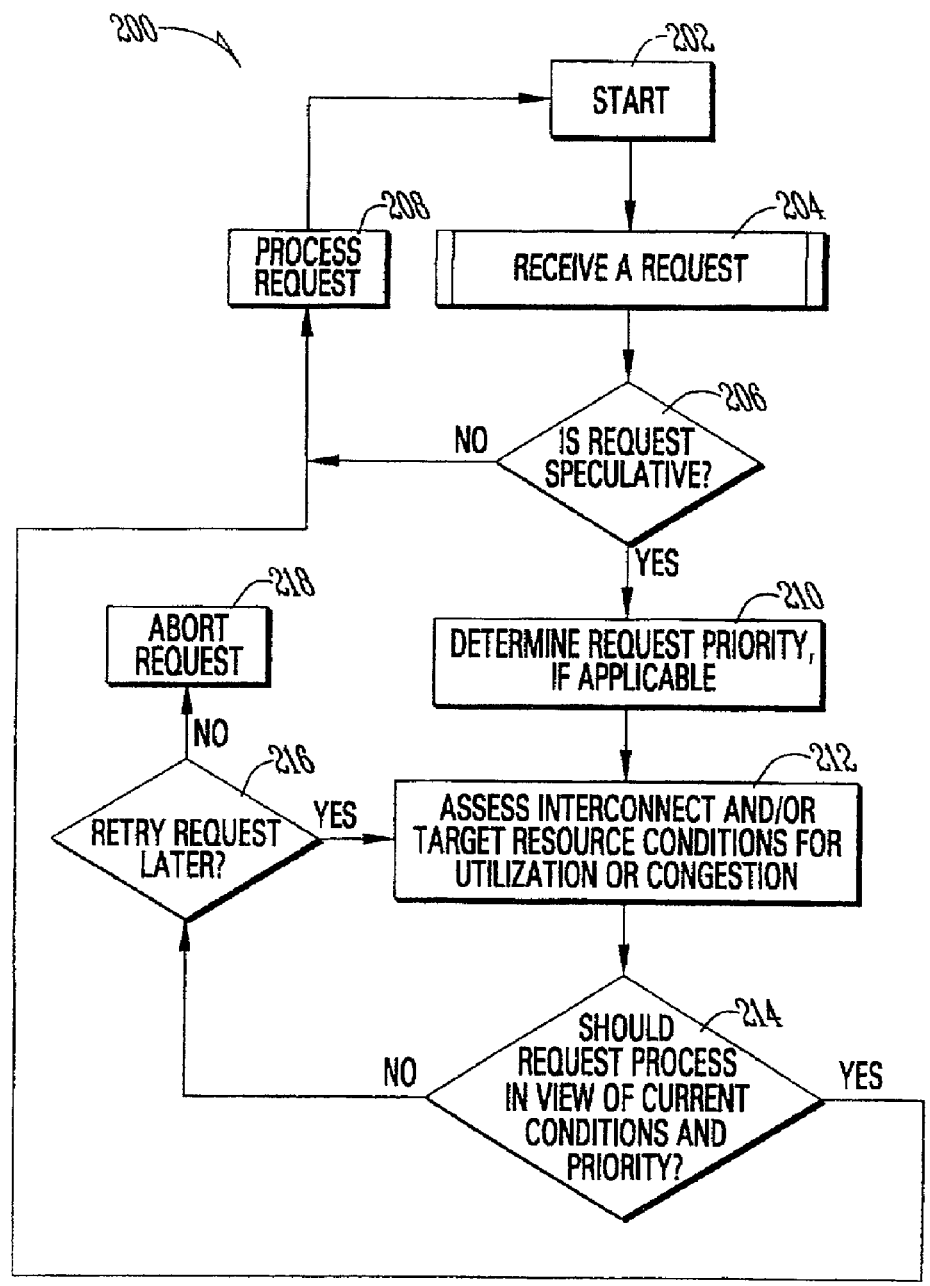

A more complete understanding of the invention may be obtained by reference to the drawings, in which:

FIG. 1 shows a system processing architecture constructed according to the invention;

FIG. 2. illustrates one instruction format to identify speculative instructions with optional priority, in accord with the invention; and FIG. 3 shows a flowchart for processing speculative requests in accord with the invention.

DETAILED DESCRIPTION OF THE DRAWINGS

FIG. 1 illustrates a processing architecture 10 of the invention. A CPU 12 connects to a memory 14 by a system bus 16 that carries data and control signals between CPU 12 and memory 14. Memory 14 may for example store instructions to be performed by CPU 12. Instruction cache 18 stores these instructions, and other CPU-generated instructions, for processing within CPU 12. FIG. 2 illustrates one speculative instruction format 100 suitable for use with the invention.

CPU 12 has one or more register files 22. Generally, register files 22 include an integer register file 22a to store integer values, a floating point register file 22b to store floating point values, and a speculative register file 22c to store speculative or temporary data. CPU 12 processes instructions through an operational unit 24, often in the form of multiple instruction pipelines 24(1)–24(n). Each of instruction pipelines 24(1)–24(n) may invoke branch predictions and speculative executions resulting in speculative data within registers 22c. A speculative load may for example be explicit or implicit, and loaded ahead of a load that is dependent upon execution of a conditional branch. This data is "speculative" since it may not be permanently used by a subsequent load instruction. If the data is actually used, the subsequent load architects the memory and that data is no longer speculative. This subsequent load execution may acquire its data from cache, memory or a register file.

To reduce latency within CPU 12, a prefetch unit 26 fetches certain instructions based on speculation that data from those instructions may be used; such data may be stored within speculative registers 22c. A bus controller 28 monitors traffic on CPU bus 30 and between various devices 22, 24, 26.

FIG. 2 illustrates a format for one 64-bit speculative instruction 100 utilized in accord with the invention. Instruction 100 has 64 bits segmented into n bits of the instruction field 102, providing instruction opcode and associated operands, and m bits of the precode control field 104, indicating whether instruction 100 is speculative or not (i.e., the speculative ID). By way of example, the n bits of instruction field 102 may define operand address information, register file addressing information, conditional information, control bits and branch value; precode field 104 may indicate that instruction 100 is a speculative memory read. Optionally, precode field 104 also has reserve bits 106 used to specify a priority for instruction 100.

To utilize instruction 100, CPU 12 identifies instruction 100 as a speculative request by decoding precode field 104.

In the event instruction 100 is not a speculative request, processing of instruction 100 continues within CPU 12 per normal. In the event instruction 100 is speculative, the instruction may be ignored or aborted, effectively delaying, sometimes permanently, the architecting of data associated with the instruction. In one example, bus controller 26 decodes instruction 100 as a speculative read request and determines that traffic on bus 30 is too congested to process instruction 100, delaying processing until a "retry" at a later time. In another example, CPU 12 determines that target memory within register file 22 is saturated and ignores a speculative load instruction 100.

FIG. 3 illustrates a flowchart 200 for processing an instruction 100 through a processing architecture of the invention, e.g., through architecture 10. An instruction transaction starts at step 202. By way of example, the transaction may be a memory read request. At step 204, the request is received, such as by a pipeline within operational unit 24. Logic decodes the instruction, at step 206, to decode the speculative ID to determine whether the request is speculative. By way of example, the logic may be a CPU, chipset, bus controller, switch or other logic handling the request. If the request is not speculative, the request is processed at step 208. If the request is speculative, the logic optionally decodes reserve bits 106 to determine a priority for the request, at step 210. The logic then assesses bus traffic, or target memory, at step 212, to determine conditions associated with the request. At step 214, the logic determines whether the request should be processed in view of those conditions. If the logic decides that conditions do not warrant processing of the request, such as during a memory saturation condition, the logic decides whether to retry the request later at step 216. If yes, the request is again processed at step 212; if no, the request is aborted at step 218. In the event that step 214 determines that conditions support continued processing of the speculative request, the request is processed at step 208. By way of example, a speculative memory request may process, after step 214, to store data within temporary memory registers 22c, at step 208.

Speculative transactions are thus "optional" as determined by the logic. As such, the request may be terminated without returning or storing data. Speculative read requests may be ignored or retried, and in some cases aborted depending on bus or target conditions. A request may be similarly aborted due to an error indication, at step 218. A priority code in reserve bits 106 may change the decision at 214 relative to current bus or target memory conditions. CPU 12 may alter the priority code of selected speculative transactions to change processing characteristics.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

Having described the invention, what is claimed is:

1. A method for processing a memory access request within processing architecture, comprising the steps of:
   determining whether the memory access request is speculative or not based upon a first identifier within the memory access request;
   assessing one or both of interconnect and target resource conditions in the event that the memory access request is speculative; and
   either processing the memory access request, or not, as a function of the conditions.

2. The method of claim 1, wherein the step of determining whether the memory access request is speculative comprises decoding the first identifier as a first bit field within the memory access request.

3. The method of claim 2, further comprising encoding the first bit field within the memory access request to define a speculative ID of the memory access request.

4. The method of claim 1, wherein the memory access request comprises one of an instruction, a message and an operational request.

5. The method of claim 1, further comprising the step of determining a priority of the memory access request based upon a second identifier, in the event that the memory access request is speculative, and wherein the step of processing the memory access request comprises processing the memory access request, or not, based upon the conditions and the priority.

6. The method of claim 5, wherein the step of determining a priority comprises decoding the second identifier as a second bit field within the memory access request.

7. The method of claim 5, further comprising encoding the second bit field within the memory access request to define a priority of the memory access request.

8. The method of claim 1, wherein the memory access request comprises one of a memory read request and a memory load request.

9. The method of claim 1, wherein the step of determining comprises utilizing one of a CPU, chipset and memory controller to determine whether the memory access request is speculative.

10. The method of claim 9, wherein at least one of the CPU, chipset and memory controller independently controls the step of processing the memory access request based on the conditions.

11. The method of claim 1, wherein the step of assessing target resource conditions comprises assessing one or more of memory utilization, memory congestion, buffer space utilization, and bus congestion.

12. The method of claim 1, wherein the step of assessing interconnect conditions comprises assessing one or more of bus utilization, bus congestion, crossbar utilization, cross bar congestion, and point to point link utilization.

13. The method of claim 1, further comprising the step of notifying one or more logic devices when the memory access request is not processed.

14. In CPU architecture that initiates both speculative and non-speculative memory access requests within a CPU, an improvement comprising decode logic for determining whether the memory access requests are speculative, based upon an identifier within each of the memory access requests, and assessment logic for determining one or both of interconnect and target resource conditions, the CPU architecture processing speculative memory access requests, or not, as a function of the conditions.

15. In CPU architecture of claim 14, the further improvement comprising a prefetch unit for prefetching speculative memory access requests, wherein the decode logic detects whether prefetched memory access requests are speculative based upon the identifier.

16. A system for processing speculative memory access requests within a processing architecture, comprising:
   one or more memory access requests having a bit field defining the memory access requests as speculative or non-speculative;
   decode logic for decoding the bit field to determine whether one or more memory access requests are speculative; and processing logic for processing speculative memory access requests, or not, based on interconnect conditions.

17. A system of claim 16, one or both of the decode logic and processing logic being located within one of a CPU, a chipset, a bus controller or a memory controller.

18. A system of claim 16, wherein the memory access requests comprise memory read instructions.

19. A system of claim 16, further comprising a bus controller for assessing one or more of bus congestion and bus utilization conditions.

20. A system of claim 16, further comprising processing logic for processing speculative memory access requests, or not, based on target resource conditions.

* * * * *